UNITED STATES PATENT OFFICE 2,302,388

INSECTICIDAL COMPOSITION CONTAINING AN AMINE HAVING ONE ALKOXYALKYLENE GROUP

William F. Hester, Drexel Hill, Pa., assignor to Röhm & Haas Company, Philadelphia, Pa.

No Drawing. Application August 26, 1941, Serial No. 408,328

9 Claims. (Cl. 167—22)

This invention relates to insecticidal compositions having as an active agent a compound of the formula

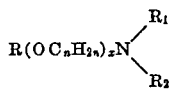

wherein R is an aliphatic hydrocarbon group having one to twelve carbon atoms, $C_nH_{2n}$ is an alkylene chain of at least two carbons in which $n$ has a value of two to four inclusive, $x$ is an integer having a value of one or more, $R_1$ is a monovalent hydrocarbon group such as an alkyl, aryl, aralkyl, or cycloalkyl group or taken together with $R_2$ an aliphatic group which jointly with N forms a heterocycle, and $R_2$ is hydrogen or a lower aliphatic group, including a divalent aliphatic group when taken in conjunction with $R_1$.

Typical groups for R include branched, straight chain, saturated, and unsaturated groups, such as methyl, ethyl, isopropyl, allyl, methallyl, isobutyl, n-butyl, amyl, hexyl, octyl, sec-octyl, undecenyl, dodecyl, etc. Typical groups for $R_1$ include methyl, ethyl, isopropyl, allyl, phenyl, substituted phenyl, and other hydrocarbon groups. $R_2$ may be hydrogen, methyl, ethyl, hydroxy-ethyl, hydroxypropyl, butyl, etc., or in conjunction with $R_1$ may be an aliphatic group such as

—CH₂CH₂OCH₂CH₂— or

—CH₂CH₂CH₂CH₂CH₂— or

—CH₂CH₂CH₂CH₂— which together with the nitrogen forms a heterocycle.

The group represented by $C_nH_{2n}$ may be an alkylene group such as

—CH₂CH₂—

—CH₂CH₂CH₂—

—CH₂CH₂CH₂CH₂—

—CH₂CH(CH₃)—

—CH₂CH(CH₃)CH₂—, etc.

The amines of this invention may be prepared by reacting an alkoxyalkylene halide, the alkylene chain of which may be interrupted by oxygen, with a primary or secondary aliphatic, cycloaliphatic, aryl, or heterocyclic amine at an elevated temperature. The reaction products may be separated by distillation, extraction, or other suitable method.

Typical of the monoalkoxyalkylene amines are the following:

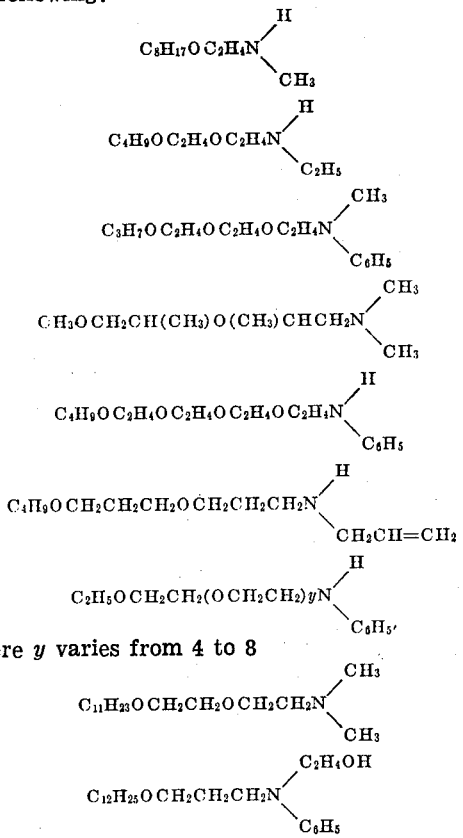

where $y$ varies from 4 to 8

Compounds of the above type are useful in insecticidal sprays as effective parasiticidal and cvicidal agents. They may be used alone or in conjunction with other amines or other toxicants. They may be used in practically all types of applications. For example, they may be used in vapor sprays which contain organic solvents. For fly sprays the amines of this invention may be diluted with petroleum naphtha. In horticultural sprays these amines may be applied from aqueous dispersions or emulsions. They may also be used in dusts.

The insecticidal use of the amines of the type here shown is illustrated in the following examples.

*Example 1*

A mixture of 180 parts of butoxyethoxyethyl chloride and 198 parts of aniline was heated at 140–156° C. for three hours. The reaction mixture was cooled, washed with an alkaline solution, dried, and distilled under reduced pressure. The fraction boiling at 160° C. under 3 mm. pressure contained the compound $C_4H_9OC_2H_4OC_2H_4NHC_6H_5$ A mixture suitable for use in aqueous sprays was prepared by mixing 25 parts of the distilled product with 20 parts of the reaction product of polyglycerol and cocoanut acids and 55 parts of pine oil. This mixture was used as an emulsion in water at 1:4000 of the amine and applied as a spray to plants infested with green aphids with a control of 90%. Comparison sprays with an accepted commercial spray gave a control of 85% under the same conditions of test.

The butoxyethoxyethyl aniline was dissolved in organic solvents and mixed with magnesium carbonate. The mixture was then dried by warming and used in an aqueous spray against bean beetle larvae on bean plants. A control of 80% was obtained with sprays containing 0.25% of the toxicant, while a 1% magnesium arsenate spray gave a control of 70%.

*Example 2*

A mixture of 180 parts of butoxyethoxyethyl chloride and 174 parts of morpholine was heated at 140–155° C. for four hours. The reaction product was washed with dilute caustic soda solution, dried, and distilled. The material, boiling at 117° C. under 3 mm. pressure had the composition $C_4H_9OC_2H_4OC_2H_4N(C_2H_4)_2O$ A spray containing 2% of this material and 98% of kerosene gave a kill of house flies three points above the official test insecticide (a solution of pyrethrum equivalent to 5% pyrethrum 20:1).

*Example 3*

A mixture of 90 parts of butoxyethoxyethyl chloride, 49.5 parts of cyclohexylamine, and 44 parts of a 50% solution of sodium hydroxide was stirred and heated at 122–130° C. for four hours. The reaction mixture was washed with water, extracted with benzene, and distilled. The fraction, boiling between 110° and 125° C. at about 2.5 mm. pressure, had the composition $C_4H_9OC_2H_4OC_2H_4NHC_6H_{11}$ This product was spread on finely divided magnesium carbonate by means of an organic solvent which was then driven off by heat. The toxicant thus carried on an inert solid was used in an aqueous spray at 0.25% and applied to bean plants which were infested with Mexican bean beetle larvae. A control of 70% was obtained which compared favorably with a 70% control from a spray with 1% magnesium arsenate.

*Example 4*

A mixture of 180 parts of butoxyethoxyethyl chloride and 135 parts of dimethylamine was heated in a bomb under about 700 lbs. per square inch pressure at about 175° C. for two hours. The reaction mixture was cooled, washed with a dilute solution of sodium hydroxide, and with water, extracted with benzene, dried, and distilled. The fraction, boiling at 118–120° C. at 24 mm. pressure, had the composition $C_4H_9OC_2H_4OC_2H_4N(CH_3)_2$ An aqueous spray containing 1% of this material carried on silica gave a control of 89% of Mexican bean beetle larvae on bean plants.

*Example 5*

A mixture of 90 parts of butoxyethoxyethyl chloride, 68.5 parts of ethanolaniline, and 54 parts of a 50% sodium hydroxide solution was heated at 124–132° C. for four hours. The reaction mixture was cooled, washed with water, dried, and distilled. The fraction distilling between 160° and 190° C. under 3 mm. pressure was composed essentially of $C_4H_9OC_2H_4OC_2H_4N(C_6H_5)C_2H_4OH$ A spray containing one per cent. of this distillate carried on magnesium carbonate was applied to bean plants infested with Mexican bean beetle larvae with a control of 99%. This compared with a control of 90% for magnesium arsenate under the same set of conditions.

*Example 6*

A mixture of 90 parts of butoxyethoxyethyl chloride, 63.4 parts of p-chloroaniline, and 34 parts of 50% sodium hydroxide solution was heated at 130–139° C. for about four hours. The reaction mixture was cooled, washed with water, and fractionated. The portion distilling between 175–180° C. at 3 mm. pressure was composed of $C_4H_9OC_2H_4OC_2H_4NHC_6H_4Cl\text{—}4$ It was applied in an emulsion, prepared as in Example 1 with pine oil and a polyglycerol-cocoanut acid emulsifier, to plants infested with green aphis. Good control was obtained and even at 1:4000 dilution 50% of the aphids were killed. A spray containing one-half per cent. of the toxicant carried on magnesium carbonate gave a 70% control of Mexican bean beetle on bean plants.

*Example 7*

A mixture of 90 parts of butoxyethoxyethyl chloride and 60 parts of methylamine were reacted in an autoclave under the conditions described in Example 4 with similar subsequent treatment. The fraction distilling between 125° and 128° C. at 35 mm. pressure, which was predominantly $C_4H_9OC_2H_4OC_2H_4NHCH_3$ was tested against Mexican bean beetle larvae on bean plants. At a dilution of 1% (on magnesium carbonate) a 92% control was obtained, against a control of 80% for magnesium arsenate under the same conditions.

It is evident from the above tests that the amines of this invention are useful as contact poisons, as stomach poisons, or as both contact and stomach poisons. They are stable compounds which may be used in many kinds of sprays. They are useful against flies, fleas, mosquitoes, and the like and have an advantage in this type of insect control in being low in odor, if not odorless, and practically free from irritation to human beings. They are effective in horticultural sprays without causing damage to plants. They are compatible with many other types of toxicants and due to the ether group act as blending agents. They may be used as the sole toxic agent of the insecticidal composition or they may be mixed with other insecticides such as pyrethrum, rotenone, derris extracts, nicotine, organic thiocyanates, etc. Those having six or more carbon atoms in a chain improve the penetrative action of sprays.

Of the compounds of this type the most available are those having two to four ethylene ether groups and of these the compounds having a terminal group of three to eight carbon atoms in the ether chain are preferred.

I claim:

1. An insecticidal composition having as an active ingredient a compound of the formula

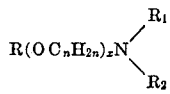

wherein R represents an aliphatic hydrocarbon group of less than 13 carbon atoms, $C_nH_{2n}$ represents an alkylene chain of at least two carbon atoms in which $n$ has a value of two to four inclusive, $x$ represents an integer of at least one, $R_1$ represents a member of the class consisting of monovalent hydrocarbon groups and divalent aliphatic groups which in conjunction with $R_2$ and N form a heterocycle, and $R_2$ represents a member of the class consisting of hydrogen, alkyl and hydroxyalkyl groups and divalent aliphatic groups which in conjunction with $R_1$ and N form a heterocycle.

2. An insecticidal composition having as an active ingredient a compound of the formula

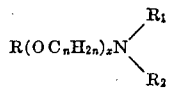

wherein R represents an aliphatic hydrocarbon group of less than 13 carbon atoms, $C_nH_{2n}$ represents an alkylene group in which $n$ has a value of two to four inclusive, $x$ represents an integer of at least one, $R_1$ represents a monovalent hydrocarbon radical, and $R_2$ represents hydrogen.

3. An insecticidal composition having as an active ingredient a compound of the formula

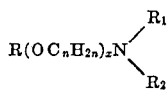

wherein R represents an aliphatic hydrocarbon group of less than 13 carbon atoms, $C_nH_{2n}$ represents an alkylene group in which $n$ has a value of two to four inclusive, $x$ represents an integer of at least one, and $R_1$ and $R_2$ together represent a divalent aliphatic group which in conjunction with the nitrogen forms a heterocycle.

4. An insecticidal composition having as an active ingredient a compound of the formula

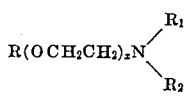

wherein R represents an aliphatic hydrocarbon radical of three to eight carbon atoms, $x$ represents an integer from two to four inclusive, $R_1$ represents a member of the class consisting of monovalent hydrocarbon groups and divalent aliphatic groups which jointly with $R_2$ and N form a heterocycle, and $R_2$ represents a member of the class consisting of hydrogen, alkyl and hydroxyalkyl groups and divalent aliphatic groups which jointly with $R_1$ and N form a heterocycle.

5. An insecticidal composition having as an active ingredient a compound of the formula

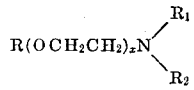

wherein R represents an aliphatic hydrocarbon radical of three to eight carbon atoms, $x$ represents an integer from two to four inclusive, $R_1$ represents a phenyl group, and $R_2$ represents hydrogen.

6. An insecticidal composition having as an active ingredient a compound of the formula

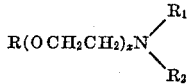

wherein R represents an aliphatic hydrocarbon radical of three to eight carbon atoms, $x$ represents an integer from two to four inclusive, and $R_1$ and $R_2$ together represent a divalent aliphatic group which jointly with the nitrogen forms a heterocycle.

7. An insecticidal composition having as an active ingredient a compound of the formula

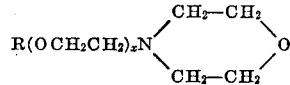

wherein R represents an aliphatic hydrocarbon group of three to eight carbon atoms and $x$ represents an integer from two to four inclusive.

8. An insecticidal composition having as an active ingredient the compound

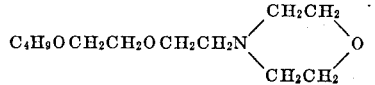

9. An insecticidal composition having as an active ingredient the compound

WILLIAM F. HESTER.